United States Patent
Mohajer et al.

(10) Patent No.: US 9,601,114 B2
(45) Date of Patent: *Mar. 21, 2017

(54) METHOD FOR EMBEDDING VOICE MAIL IN A SPOKEN UTTERANCE USING A NATURAL LANGUAGE PROCESSING COMPUTER SYSTEM

(71) Applicant: Soundhound, Inc., Santa Clara, CA (US)

(72) Inventors: Keyvan Mohajer, Los Gatos, CA (US); Bernard Mont-Reynaud, Sunnyvale, CA (US)

(73) Assignee: Soundhound, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,484

(22) Filed: Feb. 5, 2016

(65) Prior Publication Data

US 2016/0171981 A1    Jun. 16, 2016

Related U.S. Application Data

(63) Continuation of application No. 14/170,574, filed on Feb. 1, 2014, now Pat. No. 9,292,488.

(51) Int. Cl.
*G10L 15/22* (2006.01)
*G06F 17/27* (2006.01)
(Continued)

(52) U.S. Cl.
CPC .............. *G10L 15/22* (2013.01); *G06F 17/27* (2013.01); *G10L 15/02* (2013.01); *G10L 15/18* (2013.01);
(Continued)

(58) Field of Classification Search
USPC .......................... 704/1–10, 200–277
See application file for complete search history.

(56) References Cited

U.S. PATENT DOCUMENTS

| 3,919,479 A | 11/1975 | Moon et al. |
| 4,450,531 A | 5/1984 | Kenyon et al. |

(Continued)

FOREIGN PATENT DOCUMENTS

| EP | 0944033 A1 | 9/1999 |
| EP | 1367590 A2 | 12/2003 |

(Continued)

OTHER PUBLICATIONS

U.S. Appl. No. 60/222,023, filed Jul. 31, 2000, Wang et al.

(Continued)

*Primary Examiner* — Marcellus Augustin
(74) *Attorney, Agent, or Firm* — Haynes Beffel & Wolfeld LLP; Ernest J. Beffel, Jr.

(57) ABSTRACT

A method for processing a voice message in a computerized system. The method receives and records a speech utterance including a message portion and a communication portion. The method proceeds to parse the input to identify and separate the message portion and the communication portion. It then identifies communication parameters, including one or more destination mailboxes, from the communication portion, and it transmits the message portion to the destination mailbox as a voice message.

20 Claims, 4 Drawing Sheets

(51) Int. Cl.

| | | |
|---|---|---|
| *G10L 15/02* | (2006.01) | |
| *H04M 1/65* | (2006.01) | |
| *H04L 12/58* | (2006.01) | |
| *H04M 1/725* | (2006.01) | |
| *G10L 15/18* | (2013.01) | |
| *G10L 15/26* | (2006.01) | |
| *G10L 25/48* | (2013.01) | |
| *G06Q 10/00* | (2012.01) | |

(52) U.S. Cl.
CPC ............ *G10L 15/265* (2013.01); *G10L 25/48* (2013.01); *H04L 51/066* (2013.01); *H04L 51/22* (2013.01); *H04L 51/32* (2013.01); *H04M 1/6505* (2013.01); *H04M 1/7255* (2013.01); *G06Q 10/00* (2013.01); *G10L 2015/223* (2013.01)

(56) References Cited

U.S. PATENT DOCUMENTS

| | | | |
|---|---|---|---|
| 4,697,209 A | 9/1987 | Kiewit et al. | |
| 4,739,398 A | 4/1988 | Thomas et al. | |
| 4,843,562 A | 6/1989 | Kenyon et al. | |
| 4,918,730 A | 4/1990 | Schulze | |
| 4,928,249 A | 5/1990 | Vermesse | |
| 4,959,850 A | 9/1990 | Marui | |
| 5,019,899 A | 5/1991 | Boles et al. | |
| 5,164,915 A | 11/1992 | Blyth | |
| 5,436,653 A | 7/1995 | Ellis et al. | |
| 5,437,050 A | 7/1995 | Lamb et al. | |
| 5,511,000 A | 4/1996 | Kaloi et al. | |
| 5,542,138 A | 8/1996 | Williams et al. | |
| 5,577,249 A | 11/1996 | Califano | |
| 5,581,658 A | 12/1996 | O'Hagan et al. | |
| 5,664,270 A | 9/1997 | Bell et al. | |
| 5,687,279 A | 11/1997 | Matthews | |
| 5,708,477 A | 1/1998 | Forbes et al. | |
| 5,862,260 A | 1/1999 | Rhoads | |
| 5,874,686 A | 2/1999 | Ghias et al. | |
| 5,880,386 A | 3/1999 | Wachi et al. | |
| 5,907,815 A | 5/1999 | Grimm et al. | |
| 5,918,223 A | 6/1999 | Blum et al. | |
| 5,956,683 A | 9/1999 | Jacobs et al. | |
| 5,963,957 A | 10/1999 | Hoffberg | |
| 5,969,283 A | 10/1999 | Looney et al. | |
| 5,974,409 A | 10/1999 | Sanu et al. | |
| 5,991,737 A | 11/1999 | Chen | |
| 6,049,710 A | 4/2000 | Nilsson | |
| 6,067,516 A | 5/2000 | Levay et al. | |
| 6,092,039 A | 7/2000 | Zingher | |
| 6,108,626 A | 8/2000 | Cellario et al. | |
| 6,121,530 A | 9/2000 | Sonoda | |
| 6,122,403 A | 9/2000 | Rhoads | |
| 6,182,128 B1 | 1/2001 | Kelkar et al. | |
| 6,188,985 B1 | 2/2001 | Thrift et al. | |
| 6,201,176 B1 | 3/2001 | Yourlo | |
| 6,233,682 B1 | 5/2001 | Fritsch | |
| 6,292,767 B1 | 9/2001 | Jackson et al. | |
| 6,314,577 B1 | 11/2001 | Pocock | |
| 6,345,256 B1 | 2/2002 | Milsted et al. | |
| 6,363,349 B1 | 3/2002 | Urs et al. | |
| 6,385,434 B1 | 5/2002 | Chuprun et al. | |
| 6,405,029 B1 | 6/2002 | Nilsson | |
| 6,408,272 B1 | 6/2002 | White et al. | |
| 6,434,520 B1 | 8/2002 | Kanevsky et al. | |
| 6,453,252 B1 | 9/2002 | Laroche | |
| 6,504,089 B1 | 1/2003 | Nagasawa et al. | |
| 6,505,160 B1 | 1/2003 | Levy et al. | |
| 6,507,727 B1 | 1/2003 | Henrick | |
| 6,510,325 B1 | 1/2003 | Mack, II et al. | |
| 6,519,564 B1 | 2/2003 | Hoffberg et al. | |
| 6,535,849 B1 | 3/2003 | Pakhomov et al. | |
| 6,542,869 B1 | 4/2003 | Foote | |
| 6,594,628 B1 | 7/2003 | Jacobs et al. | |
| 6,611,607 B1 | 8/2003 | Davis et al. | |
| 6,614,914 B1 | 9/2003 | Rhoads et al. | |
| 6,629,066 B1 | 9/2003 | Jackson et al. | |
| 6,631,346 B1 | 10/2003 | Karaorman et al. | |
| 6,633,845 B1 | 10/2003 | Logan et al. | |
| 6,633,846 B1 | 10/2003 | Bennett et al. | |
| 6,640,306 B1 | 10/2003 | Tone et al. | |
| 6,834,308 B1 | 12/2004 | Ikezoye et al. | |
| 6,850,288 B2 | 2/2005 | Kurokawa | |
| 6,879,950 B1 | 4/2005 | Mackie et al. | |
| 6,931,451 B1 | 8/2005 | Logan et al. | |
| 6,941,275 B1 | 9/2005 | Swierczek | |
| 6,967,275 B2 | 11/2005 | Ozick | |
| 6,990,453 B2 | 1/2006 | Wang et al. | |
| 6,995,309 B2 | 2/2006 | Samadani et al. | |
| 7,017,208 B2 | 3/2006 | Weismiller et al. | |
| 7,058,376 B2 | 6/2006 | Logan et al. | |
| 7,085,716 B1 | 8/2006 | Even et al. | |
| 7,174,293 B2 | 2/2007 | Kenyon et al. | |
| 7,190,971 B1 | 3/2007 | Kawamoto | |
| 7,206,820 B1 | 4/2007 | Rhoads et al. | |
| 7,209,892 B1 | 4/2007 | Galuten et al. | |
| 7,233,321 B1 | 6/2007 | Larson et al. | |
| 7,257,536 B1 | 8/2007 | Finley et al. | |
| 7,266,343 B1 | 9/2007 | Yli-juuti et al. | |
| 7,323,629 B2 | 1/2008 | Somani et al. | |
| 7,328,153 B2 | 2/2008 | Wells et al. | |
| 7,373,209 B2 | 5/2008 | Tagawa et al. | |
| 7,379,875 B2 | 5/2008 | Burges et al. | |
| 7,444,353 B1 | 10/2008 | Chen et al. | |
| 7,516,074 B2 | 4/2009 | Bilobrov | |
| 7,562,392 B1 | 7/2009 | Rhoads et al. | |
| 7,567,899 B2 | 7/2009 | Bogdanov | |
| 7,580,832 B2 | 8/2009 | Allamanche et al. | |
| 7,672,916 B2 | 3/2010 | Poliner et al. | |
| 7,693,720 B2 | 4/2010 | Kennewick et al. | |
| 7,743,092 B2 | 6/2010 | Wood | |
| 7,756,874 B2 | 7/2010 | Hoekman et al. | |
| 7,783,489 B2 | 8/2010 | Kenyon et al. | |
| 7,853,664 B1 | 12/2010 | Wang et al. | |
| 7,858,868 B2 | 12/2010 | Kemp et al. | |
| 7,881,657 B2 | 2/2011 | Wang et al. | |
| 7,899,818 B2 | 3/2011 | Stonehocker et al. | |
| 7,904,297 B2 | 3/2011 | Mirkovic et al. | |
| 7,908,135 B2 | 3/2011 | Shishido | |
| 8,013,230 B2 | 9/2011 | Eggink | |
| 8,073,684 B2 | 12/2011 | Sundareson | |
| 8,086,171 B2 | 12/2011 | Wang et al. | |
| 8,116,746 B2 | 2/2012 | Lu et al. | |
| 8,296,179 B1 | 10/2012 | Rennison | |
| 8,358,966 B2 | 1/2013 | Zito et al. | |
| 8,554,559 B1 * | 10/2013 | Aleksic | G10L 15/30 704/235 |
| 8,762,156 B2 | 6/2014 | Chen | |
| 2001/0005823 A1 | 6/2001 | Fischer et al. | |
| 2001/0014891 A1 | 8/2001 | Hoffert et al. | |
| 2001/0053974 A1 | 12/2001 | Lucke et al. | |
| 2002/0023020 A1 | 2/2002 | Kenyon et al. | |
| 2002/0042707 A1 | 4/2002 | Zhao et al. | |
| 2002/0049037 A1 | 4/2002 | Christensen et al. | |
| 2002/0072982 A1 | 6/2002 | Barton et al. | |
| 2002/0083060 A1 | 6/2002 | Wang et al. | |
| 2002/0138630 A1 | 9/2002 | Solomon et al. | |
| 2002/0174431 A1 | 11/2002 | Bowman et al. | |
| 2002/0181671 A1 | 12/2002 | Logan | |
| 2002/0193895 A1 | 12/2002 | Qian et al. | |
| 2002/0198705 A1 | 12/2002 | Burnett | |
| 2002/0198713 A1 | 12/2002 | Franz et al. | |
| 2002/0198789 A1 | 12/2002 | Waldman | |
| 2003/0023437 A1 | 1/2003 | Fung | |
| 2003/0050784 A1 | 3/2003 | Hoffberg et al. | |
| 2003/0078928 A1 | 4/2003 | Dorosario et al. | |
| 2003/0101054 A1 * | 5/2003 | Davis | G10L 15/26 704/235 |
| 2003/0106413 A1 | 6/2003 | Samadani et al. | |
| 2003/0192424 A1 | 10/2003 | Koike | |
| 2004/0002858 A1 | 1/2004 | Attias et al. | |
| 2004/0019497 A1 | 1/2004 | Volk et al. | |
| 2004/0167779 A1 | 8/2004 | Lucke et al. | |

(56) References Cited

U.S. PATENT DOCUMENTS

| | | |
|---|---|---|
| 2004/0193420 A1 | 9/2004 | Kennewick et al. |
| 2004/0231498 A1 | 11/2004 | Li et al. |
| 2005/0016360 A1 | 1/2005 | Zhang |
| 2005/0027699 A1 | 2/2005 | Awadallah et al. |
| 2005/0086059 A1 | 4/2005 | Bennett |
| 2005/0254366 A1 | 11/2005 | Amar |
| 2005/0273326 A1 | 12/2005 | Padhi et al. |
| 2006/0059225 A1 | 3/2006 | Stonehocker et al. |
| 2006/0122839 A1 | 6/2006 | Li-Chun Wang et al. |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0242017 A1 | 10/2006 | Libes et al. |
| 2006/0277052 A1 | 12/2006 | He et al. |
| 2007/0010195 A1 | 1/2007 | Brown et al. |
| 2007/0016404 A1 | 1/2007 | Kim et al. |
| 2007/0055500 A1 | 3/2007 | Bilobrov |
| 2007/0120689 A1 | 5/2007 | Zerhusen et al. |
| 2007/0168409 A1 | 7/2007 | Cheung |
| 2007/0168413 A1 | 7/2007 | Barletta et al. |
| 2007/0201634 A1* | 8/2007 | Bonnaud .............. H04L 12/58 379/88.13 |
| 2007/0204319 A1 | 8/2007 | Ahmad et al. |
| 2007/0239676 A1 | 10/2007 | Stonehocker et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0082510 A1 | 4/2008 | Wang et al. |
| 2008/0134264 A1 | 6/2008 | Narendra et al. |
| 2008/0154951 A1 | 6/2008 | Martinez et al. |
| 2008/0215319 A1 | 9/2008 | Lu et al. |
| 2008/0235872 A1 | 10/2008 | Newkirk et al. |
| 2008/0249982 A1 | 10/2008 | Lakowske |
| 2008/0255937 A1 | 10/2008 | Chang et al. |
| 2008/0256115 A1 | 10/2008 | Beletski et al. |
| 2009/0030686 A1 | 1/2009 | Weng et al. |
| 2009/0031882 A1 | 2/2009 | Kemp et al. |
| 2009/0063147 A1 | 3/2009 | Roy |
| 2009/0064029 A1 | 3/2009 | Corkran et al. |
| 2009/0119097 A1 | 5/2009 | Master et al. |
| 2009/0124272 A1* | 5/2009 | White .................. G10L 15/30 455/466 |
| 2009/0125298 A1 | 5/2009 | Master et al. |
| 2009/0125301 A1 | 5/2009 | Master et al. |
| 2009/0216525 A1* | 8/2009 | Shostak ............. G06F 17/271 704/9 |
| 2009/0228799 A1 | 9/2009 | Verbeeck et al. |
| 2009/0240488 A1 | 9/2009 | White et al. |
| 2010/0014828 A1 | 1/2010 | Sandstrom et al. |
| 2010/0049514 A1 | 2/2010 | Kennewick et al. |
| 2010/0080365 A1 | 4/2010 | Seetharaman et al. |
| 2010/0158488 A1 | 6/2010 | Roberts et al. |
| 2010/0205166 A1 | 8/2010 | Boulter et al. |
| 2010/0211693 A1 | 8/2010 | Master et al. |
| 2010/0235341 A1 | 9/2010 | Bennett |
| 2010/0241418 A1 | 9/2010 | Maeda et al. |
| 2010/0250497 A1 | 9/2010 | Redlich et al. |
| 2011/0046951 A1 | 2/2011 | Suendermann et al. |
| 2011/0066634 A1* | 3/2011 | Phillips ............. G10L 15/22 707/769 |
| 2011/0071819 A1 | 3/2011 | Miller et al. |
| 2011/0082688 A1 | 4/2011 | Kim et al. |
| 2011/0132173 A1 | 6/2011 | Shishido |
| 2011/0132174 A1 | 6/2011 | Shishido |
| 2011/0173208 A1 | 7/2011 | Vogel |
| 2011/0213475 A1 | 9/2011 | Herberger et al. |
| 2011/0244784 A1 | 10/2011 | Wang |
| 2011/0276334 A1 | 11/2011 | Wang et al. |
| 2011/0288855 A1 | 11/2011 | Roy |
| 2012/0029670 A1 | 2/2012 | Mont-Reynaud et al. |
| 2012/0033794 A1 | 2/2012 | Jackson et al. |
| 2012/0232683 A1 | 9/2012 | Master et al. |
| 2013/0052939 A1 | 2/2013 | Anniballi et al. |
| 2013/0177143 A1 | 7/2013 | Zhou et al. |
| 2014/0019483 A1 | 1/2014 | Mohajer |
| 2014/0316785 A1 | 10/2014 | Bennett et al. |
| 2015/0149152 A1 | 5/2015 | Mohajer et al. |

FOREIGN PATENT DOCUMENTS

| | | |
|---|---|---|
| JP | H11-272274 A | 10/1999 |
| JP | 2000187671 A | 7/2000 |
| WO | WO-9517746 A1 | 6/1995 |
| WO | WO-99/18518 A2 | 4/1999 |
| WO | WO-03061285 A2 | 7/2003 |
| WO | WO-2010018586 A2 | 2/2010 |

OTHER PUBLICATIONS

U.S. Appl. No. 60/134,782, filed May 19, 1999, Rhoads.

U.S. Appl. No. 60/166,965, filed Nov. 28, 1999, Finley et al.

U.S. Appl. No. 60/158,087, filed Oct. 7, 1999, Swierczek.

U.S. Appl. No. 60/186,565, filed Mar. 2, 2000, Swierczek.

U.S. Appl. No. 60/218,824, filed Jul. 18, 2000, Kenyon et al.

U.S. Appl. No. 60/155,064, filed Sep. 21, 1999, Kenyon.

U.S. Appl. No. 14/170,570—Office Action Dated Jun. 10, 2015, 20 Pages.

PCT/US2009/066458—International Search Report, mailed Jun. 23, 2010, 16 pages.

InData Corporation, DepoView Video Review Software Product Description, "InData's Newest Video Deposition Viewer", Dec. 2007, 2 pgs.

InData Corporation, DepoView DVD, Video Review Software Product Brochure, Jun. 2008, 4 Pgs.

InData Corporation, DepoView Video Review Software Product Description, http://indatacorp.com/depoview.html, accessed Nov. 8, 2011, 2 Pgs.

Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.

Blackburn, Steven G. "Content Based Retrieval and Navigation of Music". University of Southampton, Department of Electronics and Computer Science, Faculty of Engineering and Applied Science. Mar. 10, 1999. 41 Pages.

Blackburn, Steven, et al. "A Tool for Content Based Navigation of Music". University of Southampton, Department of Electronics and Computer Science, Multimedia Research Group. Copyright 1998 ACM 1-58113-036-8/98/0008. pp. 361-368.

Blackburn, Steven G. "Content Based Retrieval and Navigation of Music Using Melodic Pitch Contours". University of Southampton, Department of Electronics and Computer Science, Faculty of Engineering and Applied Science. Sep. 26, 2000. 136 Pages.

Blackburn, Steven G. "Search by Humming". University of Southampton, Department of Electronics and Computer Science, Faculty of Engineering. May 8, 1997. 69 Pages.

Hum That Tune, Then Find it on the Web. NPR: Weekend Edition—Saturday, WKSA. Copyright 2006 National Public Radio. Dec. 23, 2006. Factiva, Inc. 2 pages.

Casey, Michael A., et al., "Content-Based Music Information Retrieval: Current Directions and Future Challenges". Apr. 2008, vol. 96, No. 4. Copyright 2008 IEEE. Retrieved from IEEE Xplore [retrieved on Dec. 29, 2008 at 18:02]. 29 Pages.

Wagstaff, Jeremy. "Loose Wire: New Service Identifies Songs You Hum". WSJA Weekend Journal. Copyright 2006, Dow Jones & Company, Inc. Dec. 25, 2006. Factiva, Inc. 2 pages.

Saltzman, Marc. "The Best Things in life are Free—for Your iPhone". Home Electronics and Technology, For Canwest News Service. Copyright 2008 Edmonton Journal. Nov. 12, 2008. Factiva, Inc. 2 pages.

First Products with Gracenote Technology to Ship in 2008. Warren's Consumer Electronics Daily. Copyright 2007 Warren Publishing, Inc. Sep. 18, 2007. Factiva, Inc. 2 pages.

Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.

(56) References Cited

OTHER PUBLICATIONS

Furui, Sadaoki. "Digital Speech Processing, Synthesis, and Recognition". Second Edition, Revised and Expanded. Nov. 17, 2000. ISBN 978-0824704520. 17 pages.

Ghias, Asif, et al. "Query by Humming". Musical Information Retrieval in an Audio Database. Cornell University 1995. 6 Pages.

Ghias, Asif, et al. "Query by Humming—Musical Information Retrieval in an Audio Database". ACM Multimedia 95—Electronic Proceedings. San Francisco, CA. Nov. 5-9, 1995. 13 Pages.

Han, Byeong-jun, et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.

Jang, Jyh-Shing Roger, et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.

Kosugi, Naoko, et al. "A Practical Query-By-Humming System for a Large Music Database". NTT Laboratories, Japan. ACM Multimedia Los Angeles, CA, USA. Copyright ACM 2000 1-58113-198-4/00/10. pp. 333-342. 10 Pages.

McNab, Rodger J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p. 11-18. 8 Pages.

McNab, Rodger J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/may97/meldex/05written.html>, 13 pages.

Pardo, Bryan, et al. "The VocalSearch Music Search Engine". EECS, Northwestern University. JCDL 2008, Pittsburgh, Pennsylvania, USA. Jun. 16-20, 2008, ACM 978-1-59593-998-2/08/06. p. 430. 1 Page.

Mobile Music: Comcast Cellular First in U.S. To Trial Breakthrough Interactive Music Service Called CD. Copyright PR Newswire, New York. ProQuest LLC. Feb. 11, 1999. Retrieved from the Internet: <http://proquest.umi.com.libproxy.mit.edu/pqdwb?did+38884944&sid=3&Fmt=3&clientId=5482&RQT=309&VName=PQD>. 3 pages.

Song, Jungmin, et al. "Query by Humming: Matching Humming Query to Polyphonic Audio". LG Electronics, Seoul, Korea. Copyright 2002 IEEE. 0-7809-7304-9/02. pp. 329-332. 4 Pages.

Taylor, Chuck. "Company Lets Listeners Dial for CDs". Billboard, vol. 1, No. 26, General Interest Module. Jun. 26, 1999. pp. 86-87. 2 pages.

Can't Get That Song Out of Your Head. Copyright 2007 The Jakarta Post. May 20, 2007. Factiva, Inc. 2 Pages.

Typke, Rainer, et al. "A Survey of Music Information Retrieval Systems". Universiteit Utrecht, The Netherlands. Copyright 2005 Queen Mary, University of London. 8 Pages.

Wang, Avery. "The Shazam Music Recognition Service". Communications of the ACM. vol. 49, No. 8. Aug. 2006. ACM 0001-0782/06/0800. pp. 44-48. 5 pages.

Melodis Rolls Out midomi mobile. Wireless News. Copyright 2008 M2 Communications, Ltd. Mar. 6, 2008. 1 Page.

Zhu, Yunyue, et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.

PCT/US2009/066458—International Preliminary Report on Patentability dated Jun. 7, 2011, 7 pages.

Chou, Ta-Chun, et al., "Music Databases: Indexing Techniques and Implementation", Proceedings of International Workshop on Multimedia Database Management Systems, IEEE, dated Aug. 14-16, 1996, pp. 46-53, 8 pages.

McPherson, John R. and Bainbridge, David, "Usage of the MELDEX Digital Music Library", 1999, in Proceedings of the International Symposium on Music Information Retrieval, (Bloomington, IN, USA, 2001), pp. 19-20, 2 pages.

Wold, Erling, et al., "Classification, Search, and Retrieval of Audio", Muslce Fish, Berkeley, CA, USA, CRC Handbook of Multimedia Computing 1999, pp. 1-19, 18 pages.

Wold et al., "Content-Based Classification, Search and Retrieval of Audio", IEEE Multimedia 1070-986X/96, vol. 3, No. 3: Fall 1996, pp. 27-36 (17 pages).

Horn, Patricia, "What was that song? With a wireless phone, find out what you heard on the radio.", The Inquirer, Philadelphia, Pennsylvania, USA, dated Feb. 11, 1999, 3 pages.

U.S. Appl. No. 13/401,728—Response to Office Action dated Jul. 17, 2014, filed Oct. 16, 2014, 16 pages.

U.S. Appl. No. 13/401,728—Notice of Allowance dated Mar. 4, 2015, 8 pages.

U.S. Appl. No. 13/401,728—Office Action dated Jul. 17, 2014, 11 pages.

Ranta, Aarne, "Grammatical Framework: Programming with Multilingual Grammars", Slides for the GF book, CSLI Stanford, Copyright 2011, 440 pages.

Ranta, Aarne. "Grammatical Framework Tutorial", Copyright Dec. 2010 for GF 3.2 [retrieved on Sep. 13, 2012], Retrieved from Internet: <http://www.grammaticalframework.org/doc/tutorial/gf-tutorial.html>. 68 pages.

"Grammatical Framework" Version 3.3.3, Copyright Mar. 2012 [retrieved on Sep. 23, 2012], Retrieved from Internet: <http://www.grammaticalframework.org>. 4 pages.

VoiceXML Tutorial (NUANCE), BeVocal, Inc., Mountain View, CA, Copyright 2005, 68 pages.

JavaScript Quick Reference, BeVocal Inc. (NUANCE), Mountain View, CA, Copyright 2005, 24 pages.

Grammar Reference, BeVocal, Inc. (NUANCE), Mountain View, CA, Copyright 2005, 102 pages.

Ranta, Aarne, "Creating Linguistic Resources with the Grammatical Framework", LREC Tutorial, Malta, May 17, 2010, 75 pages.

Conway, Damien, et al., "Synopsis 5: Regexes and Rules", Version 158, Created Jun. 24, 2002 and Last Modified Jul. 31, 2012 [retrieved Sep. 26, 2012], Retrieved from Internet: <http://perlcabal.org/syn/s05.html>, 65 pages.

Grammar's Developers Guide, Nuance Speech Recognition System, Version 8.5, Copyright 2003 Nuance Communications Inc., Menlo Park, CA, 262 pages.

Wang, Avery Li-Chun, "An Industrial-Strength Audio Search Algorithm," in ISMIR 2003, 4th Symposium Conference on Music Information Retrieval (Oct. 26, 2003), pp. 7-13.

Venkatachalam, V., Cazzanti, L., Chillon, N., Wells, M., "Automatic Identification of Sound Recordings," Signal Processing Magazine, IEEE, Mar. 2004, 92-99, vol. 21, Issue 2.

Nelson, Jeffrey, V Cast Song ID from Verizon Wireless. May 21, 2007 [retrieved on Jul. 24, 2014], Retrieved from Internet: <http://www.verizonwireless.com/news/article/2007/05/pr2007-05-21a.html>.

Gracenote: MusicID, available at http://www.gracenote.com/business.sub.--solutions/music.sub.--id/, last accessed Aug. 4, 2010.

Shazam: http://web.archive.org/web/20100501190631/http://www.shazam.com/. Last accessed May 1, 2010.

App Shopper Shazam: http://appshopper.com/music/shazam. Last changed Jul. 24, 2014.

Gracenote Mobile MusicID: http://web.archive.org/web/20100123211802/http://www.gracenote.com/business.sub.--solutions/mobileMusic/. Last accessed Jan. 23, 2010.

App Shopper MusicID: http://appshopper.com/music/musicid. Last changed Jul. 14, 2014.

Xu, et al. "Music Identification Via Vocabulary Tree with MFCC Peaks," MIRUM '11 Proceedings of the 1st international ACM workshop on Music information retrieval with user-centered and multimodal strategies, 2011. p. 21-26.http://dl.acm.org/citation.cfm?doid=2072529.2072537.

Li, et al. "Robust Audio Identification for MP3 Popular Music," SIGIR '10 Proceedings of the 33rd international ACM SIGIR conference on Research and development in information retrieval, Jul. 2010. p. 627- 634.http://dl.acm.org/citation.cfm?doid=1835449.1835554.

(56) References Cited

OTHER PUBLICATIONS

Yu, et al. "A Query-By-Singing System for Retrieving Karaoke Music," IEEE Transactions on Multimedia, Dec. 2008, vol. 10, No. 8, p. 1626-1637. http://ieeexplore.ieee.org/xpl/articleDetails.jsp?arnumber=4694852.

Liu, et al. "Content-Based Retrieval of MP3 Music Objects," CIKM '01 Proceedings of the tenth international conference on Information and knowledge management, 2001. p. 506-511. http://dx.doi.org/10.1145/502585.502670.

OMRAS2—Ontology-Driven Music Retrieval & Annotation Sharing Service. Overview—Apr. 24, 2009 [Accessed Jul. 24, 2014—Archive.org] http://web.archive.org/web/20090424083019/http://www.omras2.org/overview. 2 pages.

OMRAS2—AudioDB—Populating and Querying an AudioDB Instance. (No archived version available—accessed Jul. 24, 2014 via Google) http://omras2.org/audioDB/tutorial1. 3 pages.

Benson, et al. "Sync Kit: A Persistent Client-Side Database Caching Toolkit for Data Intensive Websites," Proceedings of the 19th International Conference on World Wide Web, Apr. 2010. pp. 121-130. http://dl.acm.org/citation.cfm?id=1772704.

Larson, et al. "NYT to Release Thesaurus and Enter Linked Data Cloud," NY Times Blogs, Jun. 2009. http://open.blogs.nytimes.com/2009/06/26/nyt-to-release-thesaurus-and-ent-erlinked-data-cloud/.

"Aurix Enhances Effectiveness of Leading Search Software," Aurix.com—News. Jun. 1, 2010. http://www.aurix.com/pages/3808/Aurix.sub.--enhances.sub.--effectiveness.- sub.--of .sub.--leading.sub.-- search.sub.--software.htm.

Jamil, "A Natural Language Interface Plug-In for Cooperative Query Answering in Biological Databases," BMC Genomics, Nov. 2011. (Accessed Sep. 27, 2012 via SpringerLink) http://www.biomedcentral.com/1471-2164/13/S3/S4.

Feng, "A General Framework for Building Natural Language Understanding Modules in Voice Search," 2010 IEEE International Conference on Acoustics Speech and Signal Processing (ICASSP), Mar. 2010. (Accessed Jul. 24, 2014—IEEE)http://ieeexplore.ieee.org/xpl/articleDetails.jsp?arnumber=5494951.

Langanke, "Direct Voice Control Speech Data Entry and Database Query Models," International Symposium on Logistics and Industrial Informatics, Sep. 2007. (Accessed Jul. 24, 2014—IEEE)http://ieeexplore.ieee.org/xpl/articleDetails.jsp?arnumber=4343522.

Indukuri, et al. "Natural Language Querying Over Databases Using Cascaded CRFs," Lecture Notes in Computer Science, Sep. 2010, http://www.springerlink.com/content/5w1x27650475304m.

Kolias, et al. "Design and implementation of a VoiceXML-driven wiki application for assistive environments on the web," Personal and Ubiquitous Computing, Sep. 2010. vol. 14, No. 6, p. 527-539,http://www.icsd.aegean.gr/publication.sub.--files/journa1/295233664.pdf.

PCT/US13/42097—International Search Report & Written Opinion dated Dec. 2, 2013, filed May 21, 2013.

Att, "Conversant VIS Version 4.0 Whole Word Bilingual Speech Recognition", Issue 1, Oct. 1993, 86 pgs.

"Contact Center Business Planning Guide", Avaya Inc., 2010, 8 pgs.

"Avaya Self-Service Optimization. Optimize the Performance of your Avaya Self-Service applications", Avaya, Inc., 2011, 4 pgs.

"VoiceXML Tutorial. Developer documentation", Bevocal, Inc., 2005, 68 pgs.

Brick, T, et al. "Incremental Natural Language Parsing for HRI", Journal of the Association for Computing Machinery, Mar. 10-12, 2007, 8 pgs.

Charniak, E, Goldwater, et al. "Edge-Based Best-First Chart Parsing", 1998, 8 pgs.

Crisostomo, A. "Constituents and Phrases", Jul. 2011, 43 pgs.

Copestake, A, et al., "Minimal Recursion Semantics: An Introduction" Research on Language and Computation, vol. 3, pp. 281-332, 2005.

Deobhakta, N., "Natural Language Processing, User Interfaces, and the Semantic Web". Proceedings from the Third Annual HCI Symposium, Dec. 2012, 22 pgs.

"ECMAScript Language Specification", ECMA-262, ECMA International, 5.1 Edition, Jun. 2011, 258 pgs.

Graham, P., "Parsing with ATNs", Engelwood Cliffs, NJ, Prentice Hall, 1993, 16 pgs.

McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13-SemanticAnalysis%2Fsemantics.ppt&ei=Xdb4VMPDIcvso-AS2soGABg&usg=AFQjCNGiXuBWLO-oQB_MLor_kN_8ATdpRg&sig2=BnvJvvJJo3OApAC6ny0guQ&bvm=bv.87611401,d.cGU.

Huang, L, et al., "Dynamic Programming for Linear-Time Incremental Parsing". Proceedings of the 48th Annual Meeting of the Association for Computational Linguistics, pp. 1077-1086, Jul. 2010.

Iqbal, R, et al., "A Negation Query Engine for Complex Query Transformations". Journal of Science and Technology, pp. 193-204, 2013.

Klein, D, et al. "Accurate Unlexicalized Parsing", Proceedings of the 41st Meeting of the Association for Computational Linguistics, vol. 1, pp. 423-430, 2003.

Matsubara, S, et al., "Chart-based Parsing and Transfer in Incremental Spoken Language Translation", Proceedings of the Fourth Natural Language Processing Pacific Rim Symposium, 1997, 4 pgs.

Mohri, M, et al., "Weighted Finite-State Transducers in Speech Recognition", Computer Speech and Language, Jan. 2002, 26 pgs.

Murase, T, et al., "Incremental CFG Parsing with Statistical Lexical Dependencies", Proceedings of the Sixth Natural Language Processing Pacific Rim Symposium, Nov. 2001, 9 pgs.

New, B., "Question Answering at TREC", Pre-Internship report, Mar. 2008. 4 pgs.

Nortel Norstar, "Voice Mail Speech Recognition Automated Attendant", Product manual [online]. 29 pgs. Nortel Norstar [retrieved Sep. 4, 2012]. Retrieved from the Internet: <URL: https://downloads.avaya.com/css/P8/documents/100141923>.

Norvell, T., "A Short Introduction to Regular Expressions and Context Free Grammars", Project report, Nov. 2002, 5 pgs.

Quesada, J, et al. "Design of a Natural Language Command Dialogue System". Project deliverable 3.2, SIRIDUS, 2000, 91 pgs.

Seneff, S., "TINA: A Natural Language System for Spoken Language Applications", Journal of the Association for Computational Linguistics, 18 (1), pp. 61-82, Mar. 1992.

Seneff, S, et al., "Galaxy-II: A Reference Architecture for Conversational System Development", Proceedings of the International Conference on Spoken Language Processing, Nov. 1998, 5 pgs.

Stolcke, A., "An Efficient Probabilistic Context-Free Parsing Algorithm that Computes Prefix Probabilities", Journal of the Association for Computational Linguistics, 21 (2), Jun. 1995, pp. 165-201.

"Do you know the true cost of IVR migration?" Datasheet. Aspect Software Incorporated, Dec. 2012, 4 pgs.

Zlatanov, T. "Cultured Perl", Nov. 2004, 13 pgs. [retrieved Oct. 22, 2014]. Retrieved from the Internet: <URL: http://www.ibm.com/developerworks/linux/library/I-cpregex/index.html>.

Younger, Daniel H., "Recognition and parsing of context-free languages in time n3", Information and Control, vol. 10, Issue 2, Feb. 1967, pp. 189-208.

Guzzino, Didier, "Active: A Unified Platform for Building Intelligent Applications", Jan. 23, 2008, 263 pgs.

"Nuance Recognizer 9.0: Language Pack Guide", Nuance Communications, Inc., 2007, 34 pgs.

U.S. Appl. No. 13/842,735—Office Action dated Feb. 20, 2015, 12 pages.

U.S. Appl. No. 13/480,400—Notice of Allowance dated Aug. 15, 2013, 9 pages.

U.S. Appl. No. 13/480,400—Notice of Allowance dated Nov. 7, 2013, 10 pages.

U.S. Appl. No. 13/480,400—Office Action dated May 7, 2013, 15 pages.

U.S. Appl. No. 13/480,400—Response to Office Action dated May 7, 2013, filed Jul. 8, 2013, 13 pages.

(56) References Cited

OTHER PUBLICATIONS

U.S. Appl. No. 13/849,290—Notice of Allowance dated Jan. 23, 2015, 8 pages.
U.S. Appl. No. 13/844,028—Office Action dated Nov. 7, 2015, 14 pages.
U.S. Appl. No. 13/193,514—Office Action dated Jul. 17, 2015, 15 pages.
U.S. Appl. No. 13/193,514—Office Action dated Aug. 22, 2015, 20 pages.
U.S. Appl. No. 13/193,514—Office Action dated Jan. 6, 2014, 20 pages.
U.S. Appl. No. 13/193,514—Response to Office Action dated Jan. 6, 2014, filed May 6, 2015, 11 pages.
U.S. Appl. No. 13/193,514—Response to Office Action dated Aug. 22, 2014, filed Jan. 8, 2015, 7 pages.
U.S. Appl. No. 13/193,514—Response to Office Action dated Aug. 22, filed Dec. 22, 2014, 9 pages.

* cited by examiner

METHOD FOR EMBEDDING VOICE MAIL IN A SPOKEN UTTERANCE USING A NATURAL LANGUAGE PROCESSING COMPUTER SYSTEM

PRIORITY CLAIM

This application is a continuation of the U.S. application Ser. No. 14/170,574, "Method for Embedding Voice Mail in a Spoken Utterance Using a Natural Language Processing Computer System", filed on Feb. 1, 2014, which is hereby incorporated by reference for all purposes.

TECHNICAL FIELD

Broadly, the presently disclosed embodiments relate to speech recognition systems, and more particularly to speech recognition systems capable of analyzing and processing natural language inputs.

BACKGROUND

Natural language requests often make use of a compound form, in which implicit quotes exist around a part of the request sentence. The ability to understand combined requests generally pose no problem for humans to sort out. When a teacher asks a student, "Tell your mother to call me tomorrow," the student has no trouble understanding what the teacher meant and how to execute his request. The teacher's sentence has two parts, a communication request ("Tell your mother") which describes a transmission act, and a message ("call me tomorrow") which is the main content to be communicated, along with the knowledge that the message was from a certain teacher, and in what context, such as time and place. To perform a similar task in response to a user's spoken request, a computer system will analyze the utterance, recognize a communication request and separate it from the message, analyze the communication request to determine what transmission action is requested, and analyze the message to transmit. Automated conversational agents exist today (such as Apple's Siri) that are able to perform such a task. In this case, and in other prior art systems, the effect of the user's request is to send a message as transcribed text. This is useful, especially if the transcription is correct, the recipient is equipped with a device to display text, and the meaning of the message is properly conveyed by text alone, in the absence of prosody features (such as tone of voice and pauses) found in the original voice signal.

The ability to automate the process of analyzing a complex statement such as the one above, consisting of a communication request and a message, coupled with the ability to perform the required communication acts, will also prove advantageous in the area of voice mail. Voice mail is essential in the modem age, as people are accustomed to the idea that every phone call will result in a communicated message, whether or not the recipient was available to answer the call. With voice mail, the message to transmit is taken straight out of the user's speech, as an audio signal. It is interesting to note that smart phones are able to record audio, and they handle telephone communications, the latter possibly resulting in leaving voice mail after various steps and delays; but they do not allow a user to send voice mail in one deliberate step, where a single request results in sending voice mail. The use of virtual agents that understand natural language is becoming more widespread, and in this context, a more effective way to send voice mail will be for users to do this with a single spoken request. This request will combine a communication request (which specifies the destination) and the message (i.e., the content of the voice mail); yet the art does not offer that possibility. In fact, directly embedding voice mail in a spoken utterance requires novel techniques.

SUMMARY

An aspect of the present disclosure is a method in a computerized system for processing a spoken request to send voice mail. The method begins by receiving and recording speech input from a user. It proceeds to parse the spoken utterance to identify and separate a communication portion, which indicates one or more recipients or destination mailboxes, from a message portion, which is the voice mail. It then transmits voice mail to the destination mailbox.

DETAILED DESCRIPTION

Figure 1:
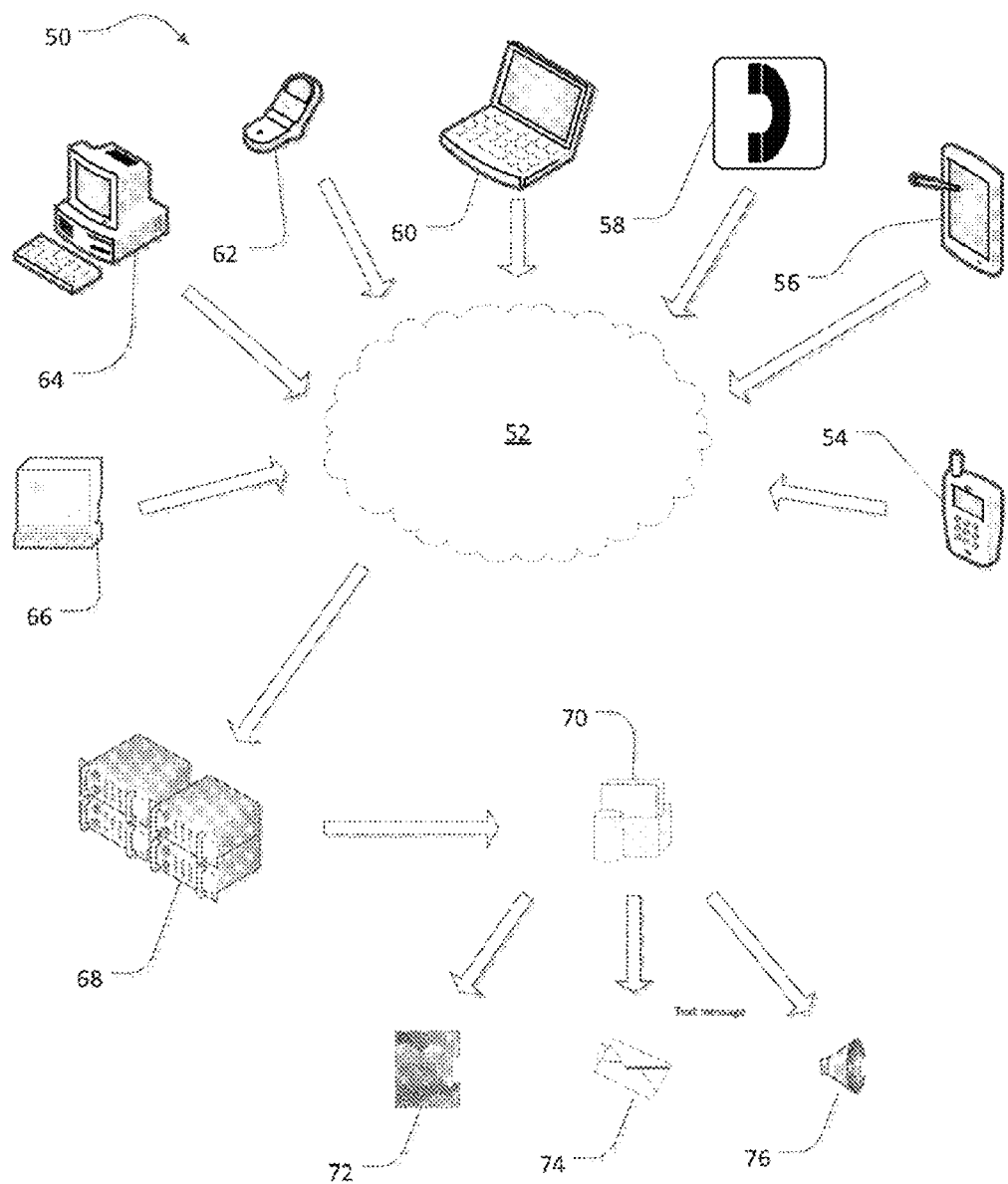
FIG. 1 illustrates an operating environment within which a system for combining a message with a communication portion in a natural language computer system can function, according to the present disclosure.

The following detailed description is made with reference to the figures. Preferred embodiments are described to illustrate the disclosure, not to limit its scope, which is defined by the claims. Those of ordinary skill in the art will recognize a number of equivalent variations in the description that follows.

DEFINITIONS

The term "natural language understanding computer system" broadly includes computer systems that accept spoken inputs from users, where those inputs are structured in normal spoken language, and are capable of responding to such inputs in an appropriately intelligent way. Here, "computer system" should be understood in its broadest context, including large server-based systems, desktop systems, and mobile systems of all types. The term "request" in the context of a computer system indicates an input from the user designed to cause the computer system to perform an action, rather than return information. "Voice mail" indicates a system such as a computer-based network that records and stores incoming telephone calls for a user. This term broadly includes various methods and means to interface a telephone system to a computer system, as well as systems operable on digital or voice over IP (VoIP) systems. "Destination" indicates a desired endpoint for message, which could include one or more of a telephone number and its associated answering machine, a voice mail mailbox, an email address, a user account on a social networking site, a user account on the system used to initiate the communication, and the like. The term also encompasses portions of such systems that attempt to provide transcripts of incoming calls for the user. For example, there are smartphone apps that, upon receiving voice mail for a user, will create a multi-media message (MMX) consisting of the text transcription along with the original audio of the voice mail. The transcription and MMX coding may also be performed by the sender. The technologies for delivery of "voice mail" encompass a wide range of options now available and hereafter developed for transmitting information from one person to another. Specifically, voice mail as presently envisioned includes audio messages and multimedia messages, as well as any other media for transmitting voice information. In another embodiment, a video message can be handled in essentially the same way; video content is added to the multimedia message, leaving the rest of the processing methods unchanged. For example, one teenager grabs her smartphone, opens the video message app and says "Send Mom, Hi Mom look at the mess my sister left in the kitchen," with the expected effect that a suitably delimited video message is sent to Mom, with a transcription. Of course, many use cases for this app will be more useful than the humorous teenager example. A combined request indicates a user input that includes both a communication portion and a message, as set out in detail below. Those skilled in the art will understand that the definitions set out above do not limit the scope of the disclosure.

Overview

Broadly, the present disclosure relates to systems and methods for combining a communication portion and a message portion as a single spoken input to a computer system capable of processing natural language. Generally, the system parses an input to separate the communication portion from the message portion. The voice message proper is a segment extracted from the original audio content of the utterance. The message is optionally processed to create a text transcription; this option may be controlled by a user preference or by other means. The communication portion is processed to identify communication parameters, including one or more message destinations and content formats. The message is then sent to the requested destinations, as the recorded audio content, or possibly video, message metadata such as sender, time of day, message format and more, and the optional text transcript.

Exemplary Embodiments

FIG. 1 depicts an operating environment in which the system and method of the present disclosure can operate. In general, a range of user devices may be used for communicating with a network. Each user device includes a natural language computer system, which accepts natural language request to accomplish a variety of tasks. Using a selected user device, a user composes a combination message, which is then transmitted via the network to a server. From the server, the message is transmitted to a required destination, where it is held for the recipient.

Operating environment 50 takes in a wide range of user devices. Exemplary devices shown here include a smartphone 54, a tablet computer 56, a conventional telephone 58, a laptop computer 60, a cellular telephone 62, a desktop computer 64, or workstation 66. Alternatives to these devices will be undoubtedly provided in the future. Fundamentally, user devices all share the characteristic of being employed by a user to send communications, generally including audio, text, and multimedia information.

Network 52 can be any of the various sorts of communication networks available to users, such as the Internet. Other networks can be a private network, embodied either as a wide area network (WAN) extending over considerable space and user communities, or a local area network (LAN) limited to a private residence, a building, or similar relatively limited user community. Network 52 transmits the message to a server 68. The server, which can be provided in a number of implementations, varying widely in size, scope, and computing power, cooperates with the chosen user device to process and package the combination message for transmission to a destination 70. The destination can be, for example, a voice mail mailbox, a telephone number capable of receiving SMS transmissions, or a device capable of receiving MMX transmissions. The mailbox delivers content as an audio message 76, or a text message 74, or a multimedia message 72. It should be noted that text messages 74 can include both SMS messages and transcriptions of audio messages, as explained in more detail below.

Figure 2A:
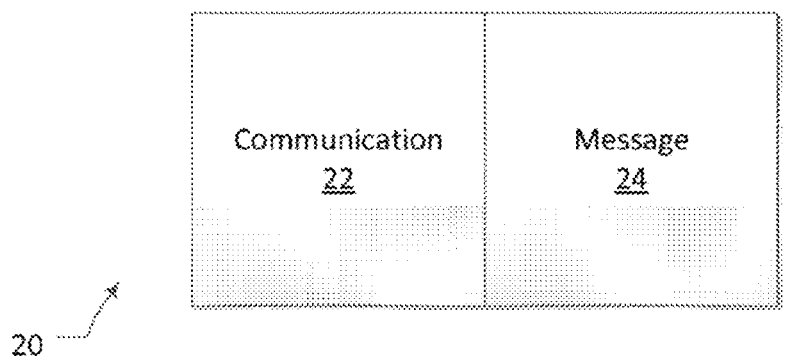
FIG. 2a is a block diagram of a combined utterance consisting of a communication portion and a message portion, according to the present disclosure.

FIG. 2a is a block diagram depicting a combined request 20. A combined request 20 includes two portions, a communications portion 22 and a message portion 24. As set out in more detail below, the communication portion 22 includes sufficient information for the system to send the message from the sender to the destination. Details of that information, and the manner in which it is assembled, are set out below.

Figure 2B:
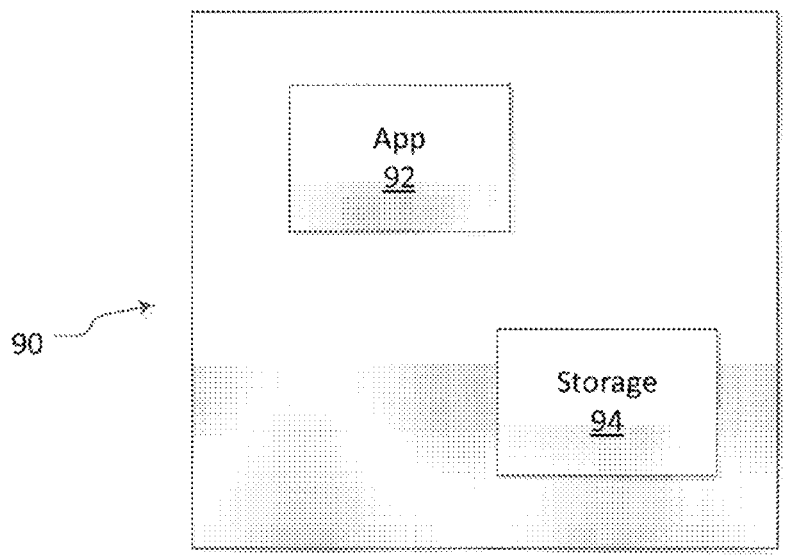
FIG. 2b is a block diagram of a system for combining communication portion with a message within a natural language computer system, according to the present disclosure.

FIG. 2b is a block diagram of an exemplary system 90 for combining a communication portion and a message portion of a combined request in a natural language processing system. It will be understood that system 90 is an independent module operating within a natural language processing system contained within a user device. Conventional functions for such a natural language processing system include receiving and interpreting requests for operating various features of the particular user device. For example, a smartphone, such as smartphone 54 of FIG. 1, can employ a natural language processing system to handle requests such as "Call home," which will normally cause the smartphone to dial the user's home telephone number.

The system 90 includes at least an application portion 92 and system storage 94. The application portion 92 performs the function set out in connection with FIGS. 3 and 4, discussed in more detail below. System storage 94 is a volatile memory storage, capable of storing incoming data, including message portion 24 of a speech utterance.

Figure 3:
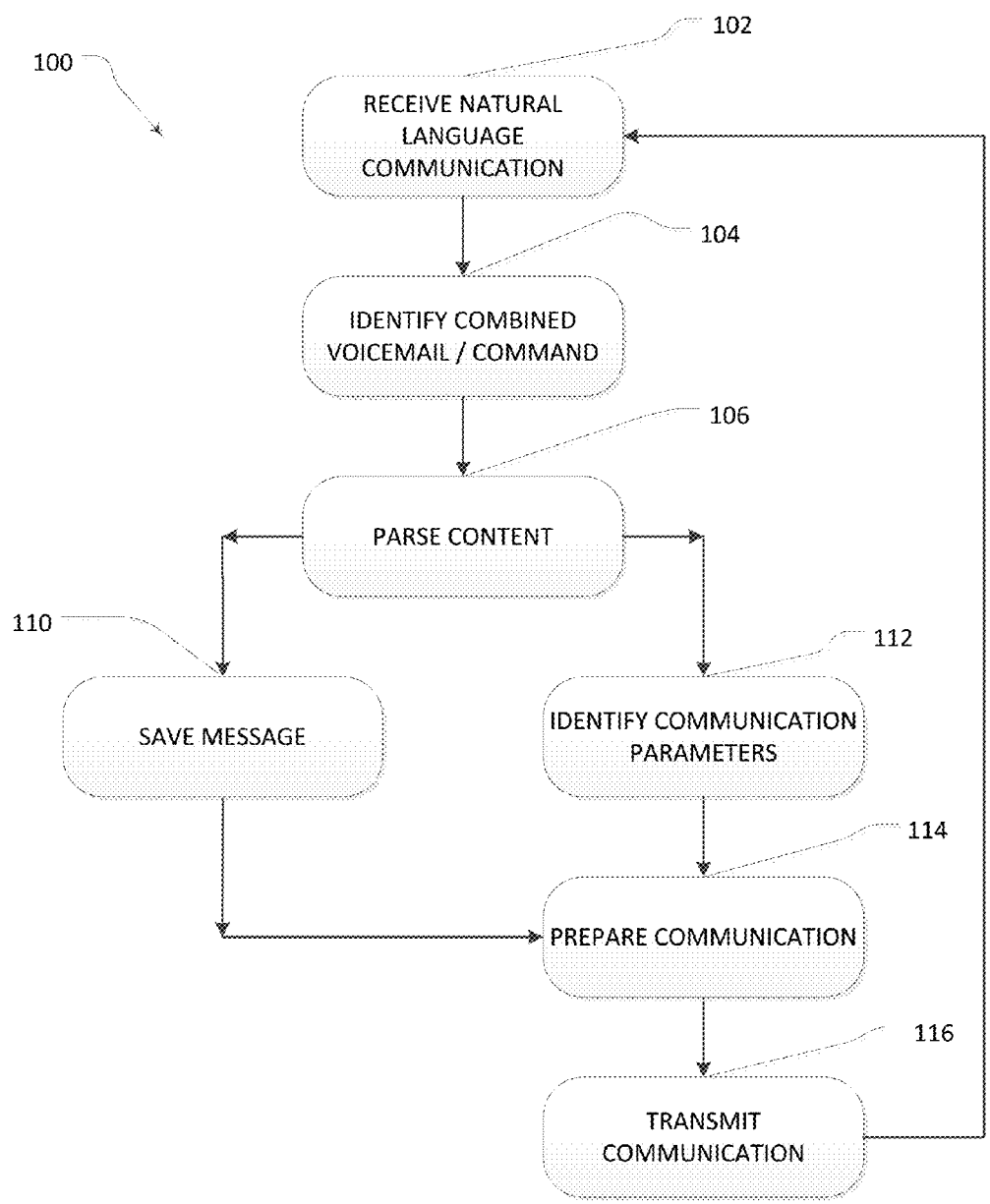
FIG. 3 is a flowchart illustrating an exemplary embodiment of a method for combining a communication portion with the message in a natural language computer system, according to the present disclosure.

FIG. 3 is a flow chart of an embodiment of a method 100 for processing a natural language spoken utterance that contains a combined request, with a communication portion and a message portion. The process can be envisioned as three sets of actions. First, the input is received and prepared for further processing. Processing then occurs, with separate actions aimed at handling the message and preparing communication parameters. Finally, the implied communication channel is used to transmit the message to the required destination. The term "implied communication channel" covers both an express communication channel, which could be identified in the input as "Use the telephone to tell my wife . . . " and an implied channel, which could be set out in a message such as, "Call home and tell my wife I am on the way," which implies but does not expressly request the use of the telephone.

The method 100 begins by receiving a natural language communication. In keeping with the definition set out above, a natural language communication signifies human speech, delivered by a suitable means to the computer system at step 102. A wide variety of delivery means can be employed to present the human speech to the user device. Most directly, a human being can speak into a receiving device, such as a microphone, which connects directly to the user device. For example, contemporary laptop computers generally include an integral microphone, and a user could speak into that microphone to present natural language input. Alternatively, the natural language input could be delivered from a remote location. For example, a user could speak into a mobile device, such as a smartphone, and that device could forward the natural language input to a host system. The system could reside on a server, for example. The server could work through the method 100, and any response could be directed as required, with an acknowledgment sent to the original user at her smartphone. Alternatively, input could be provided to a computer system from a recording device. In that manner, a user could record notes, message or other audio material on a recording device, which could be part of a mobile device, such as a tablet computer. The recorded material could later be passed on to the method of the present disclosure for sending a message to one or more recipients. Those of skill in the art can imagine the variety of scenarios that are possible within these parameters.

The computer system then identifies an initial portion of the natural language input as a communication request, and treats the rest as a message portion, until a pause of sufficient length, or encountering a reserved "stop" keyword. It should be noted that traditional keyword-based speech recognition systems may operate by separately performing the operations of identifying specific keywords, then parsing the rest of the utterance accordingly, while more sophisticated systems may combine those operations. Either approach can implement the present disclosure. In some embodiments, the operations of recognizing the need for a combined voice mail analysis, at step 104, performing the separation of the request and message portion, at step 106, and performing the analysis of communication parameters, at step 112, will be separate. Such an embodiment can be easily implemented with keywords, used to identify the request, and to mark the beginning and the end of the message portion. The weaknesses and awkwardness of a keyboard-based system are discussed elsewhere in this application.

An alternative (preferred) embodiment of this invention employs a state-of-the-art incremental parser for speech. The well-known method of incremental parsing will be extended to include semantic interpretation, probability weights, and other features to be described below. Such an advanced system is disclosed in U.S. patent application Ser. No. 13/842,735, entitled "An Integrated Programming Framework for Speech and Text Understanding with Meaning Parsing," filed Mar. 15, 2013, which application is hereby incorporated into the present application in its entirety, for all purposes. This system analyzes natural language input on an ongoing basis, scanning, parsing and interpreting input speech left-to-right, according to the rules of a grammar. Note that the disclosed system handles context-free grammars, yet most uses of this invention can be managed using a regular grammar or even a finite state grammar. As a result, and although the reference to disclosed system is useful to point at a sophisticated embodiment of the invention, simpler systems for parsing and interpretation will be entirely capable to perform the necessary tasks. Even the incremental property of the parser (working from left to right and keeping parses in parallel) can be seen as unnecessary.

As expected in any incremental parser, multiple parses up to the current point are maintained in parallel. In the preferred embodiment, only the best N such parses are kept at each point in the scanning, according to the beam search technique, also well known in the art. These active parses are alternatives that may be extended further, possibly to a full parse if the end of the utterance is reached, or may vanish whenever a match is no longer possible, or the parse falls out of the beam (the top N parses). Besides the use of an incremental parser, the disclosed system augments the context-free grammar using semantics, which are expressed using code in a high-level programing language (C++), and are able to extract request types and parameter values. In this system, the ability to assign a probability weight to each parse allows disambiguation and the choice of the most likely parses, based on all factors available, which improves the reliability and flexibility of the system. It is again worth noting that the full capability of the disclosed system is not required to implement the invention. Simpler systems will be able to parse the utterance to extract request types and parameter values. In particular, the use of probability weights to resolve ambiguities, although it improves the reliability of speech recognition, is not a required aspect of the disclosure.

One aspect of this embodiment, when expressed in the form of a grammar, is a special-purpose non-terminal, called AUDIO, which matches an essentially arbitrary segment of the input audio; in this disclosure, we use fully capitalized words to denote grammar non-terminals. The non-terminal AUDIO can match a speech segment without a need for parsing or phonetic analysis; it does not match a sequence of grammar symbols, as other non-terminals do. That said, the audio segment matched by AUDIO is not fully arbitrary; it must be delimited by pauses in the speech. Those familiar in the art know that pauses in speech can be identified (and delimited in the input audio by their start and end positions) using a voice activity detector; many VAD methods exist. When matching AUDIO from a given position in the speech (which will always be a pause) a succession of pauses may be found before the end of the utterance. Each position will correspond to an "alternative parse" for the AUDIO segment, or at least, be treated that way by the parser. The capability of handling parallel parses is part of the method. Pauses have varying length, and when the system uses probability weights, it will be desirable to give a higher weight to a longer pause.

The role of the AUDIO non-terminal in parsing utterances will now be described. A parser depends for its operation on a precise grammar, used to describe the set of allowable requests. As an illustration, we provide a (regular) context-free grammar that covers a number of ways of expressing communication requests. Assume first that DESTS is a non-terminal used to specify allowable destinations. It is a sub-grammar for single or multiple recipients, but the details are not essential here. It should be noted that destination lists can be generated with the regular "+" operator for iteration. Turning to entire requests, let VMU designate "Voice Mail Utterance," the corresponding non-terminal. The following grammar rules are illustrative. The notation uses brackets for optional components; concatenation is implicit; a vertical bar denotes alternative options; and parentheses affect grouping in the normal way:

REQUEST::=send (voicemail|voice) to DESTS
VMU::=REQUEST [begin|start] AUDIO [stop|end]

Given the proper definition for DESTS (not essential here) the rules above should support such communication requests as "send voicemail to Paul and Mary", or "voicemail Mom" or "voice 1.415.987.6543", and all of these requests are followed by the actual voicemail audio. Note that the delimiters begin . . . end or start . . . stop are not required, since pauses act as delimiters; but their explicit use lets the user have more control over the segmentation.

It is also possible to add syntax alternatives in which the destination(s) follow the voicemail. Omitting the begin . . . end variants, here are illustrative examples:

VMU::=(voicemail|voice) AUDIO to DESTS
VMU::=send AUDIO (as|using) (voicemail|voice) to DESTS With this grammar, the parser can recognize the presence of a combined request, and the attached semantics will extract the required values. This embodiment performs steps 104, 106 and 112 simultaneously. It is understood that the semantics associated with AUDIO will be to extract the audio segment and make it available for further processing; and the semantics of DESTS is to extract a list of destinations, which may consist of multiple communication parameters, as will be discussed elsewhere.

A less sophisticated alternative embodiment is a keyword-based system. Such a system will recognize requests from the use of specific trigger words, and respond by executing a related request, without further analysis. Thus, if such a system encounters the word "stop", it will respond by ceasing work, even when that word occurs in the phrase "keep going until you reach the stop sign." A simplified embodiment of the present disclosure could indicate the presence of a combined communication request by the use of a keyword or similar identifier. In such systems, the user could say, for example, "voice mail," "send mail" or a similar word or phrase. The system could recognize the keyword as satisfying the requirements of step 104.

Keywords can identify actions to be taken, or they can stake out boundaries in speech flow, but they impose a marked drag on dialog efficiency, because users must be aware of keywords from both sides. One must not inadvertently use a keyword in the normal course of speaking, as exemplified above, and at the same time, one must also remember which keywords perform which functions. Keyword systems, then, do not achieve the full effectiveness of the present invention, which aims at allowing a user to speak naturally. That requirement presents the necessity for a sophisticated processing system, but it allows a user to proceed based upon nothing more than good speech habits. For example, most speakers pause momentarily when speaking a phrase such as, "Here is a message for John. We will meet you at 7 o'clock." The normal pause between sentences is generally accentuated in this situation, emphasizing the difference in content. A sophisticated natural language analysis could look for and recognize such a pause to help separate the communication portion from the message portion of the input utterance.

Having identified the presence of a combined request, step 106 separates the communication portion from the message portion by parsing the language content. Here, such parsing requires the system to identify and separate the message portion of the input from the communication portion. One technique for accomplishing that task is set out in detail above. Other techniques can be employed, as known to those of skill in the art.

After parsing the content of the input, processing splits into two paths, which proceed independently, generally in parallel as shown; however, sequential processing in either order could be used if energy/processor/memory or other constraints so dictate. At step 110, the system processes the message contained in the natural language input. This process is discussed in connection with FIG. 4, below.

Simultaneously, at step 112, the system identifies the required communication parameters. Required communication parameters will depend upon the particular situation, including the identification of the device being employed. In general, several types of voice mail destinations can be distinguished.

The most common destination is a telephone number, which the system dials. If a person answers the call, the system can detect that fact and respond with a message from the user that a message is about to be sent. If an answering device (either belonging to an individual or set up by the telephone service provider) responds, the system can simply wait to receive a signal that it can play the voice message immediately. That method very closely approximates the steps a human user would follow to deposit a voice message.

In many instances, however, greater efficiency and speed of use could be obtained if the system could work directly with the telephone provider. There, if the provider were to make available a suitable interface, accessed, for example, through a special number or prefix, then the system could make contact directly with that interface and simply deposit an electronic copy of the message. That process could proceed extremely rapidly.

As automated communication becomes more common, it can reasonably be anticipated that a larger number of telephone system providers will facilitate incoming communications by setting out publicly accessible interface ports. As such facilities develop, protocols will be adopted, such as the ability to query a site to determine the required communication parameters to make contact, allowing the system to start only with the knowledge of the end receiver, gaining information about the communication process interactively. Providers, working at the same time, will cooperate with natural language site operators to speed communications. Providers may well compete to offer the best environment for such programs.

The system may be required to infer the exact destination from the body of the message. For example, if the input includes, "Tell Natalie I will be home at 6:30," the system can immediately identify that the intended recipient is "Natalie". In some embodiments, the information required to reach the intended recipient could then be determined, by looking at the speaker's contact list, combined with a log of recent calls. From that information, the system can infer that the speaker is referring to his wife, for example, and the system can also find the telephone number in the speaker's contact list. If the system does not find enough information to establish the recipient's identity with a fair degree of confidence, it can ask the speaker for additional input. Alternatively, the system can be configured to include keywords for frequent communication recipients. Using that feature, a user can quickly adding nicknames to already-identified contact listings, so that the vast majority of intended recipients are identified by the system using the same nickname as the user employs in ordinary conversation.

Another required communication parameter may be the communication channel. In this instance, some semantic analysis may be required to identify the proper channel. For example, the input set out above contains the verb "tell". A computer device cannot literally tell a person something, but it can determine a preferred channel for such a person. In general, the present disclosure focuses on transmitting messages as voice mail, but other channels could be used as well. Here, a user could have a preset preference, so that system memory includes a setting directing that communications to the user's spouse should be sent via voice, while another setting could indicate that messages to co-workers be sent via SMS or by a particular text messaging system. Other recipients may be known to prefer their voice mail sent by email, in audio or text form. A number of possibilities in this area will be clear to those of skill in the art. After the system has been in use for a time, the system can associate particular natural language expressions with specific recipients, as well as particular recipients with known communication channels. For example, the system could store previously understood inputs, in the context of which it would interpret the request "tell Natalie" as "send a voice message by telephone to my wife Natalie." Alternatively, as is known in the art, a natural language system can be trained to recognize and relate such factors.

Other combinations of recipient and communications channel can be directly derived from the input, preset, or inferred from past behavior. Communication channels can be chosen from among available systems, such as email, MMX, SMS, instant message (e.g., XMPP), voice communication, and the like. Recipients can be identified as individuals or distribution lists. All of these can be determined by the system by quick investigation of a contact list, such as the contact list maintained by a particular communication system, such as Outlook email, or a list maintained on a particular device, such as the contact list maintained by a particular iPhone. Specialized contact lists can be accessed by importing them. One may import a company contact list, by using a special import routine, for example. In addition to identifying the destination and channel, communication parameters could include a preferred carrier, alternate channels, and technical details, as known to those in the art. These and other specialized communication parameters may be set up by the user, or they may be maintained as user preferences, as known to those in the art. Over time, the system can develop enough information so that it can infer communication parameters by consulting past user behavior.

Similarly, communication channels can be selected from those available at the time this application is filed, or from among communication channels developed hereafter. Such channels can be identified generically, so that when a user says, "call Frank Overton," the system understands that it should use the default telephone provider available to the system (or communications provider, to anticipate continued progress and change in the telecommunications industry. As with recipients, the system can gain experience over time. The system can employ such an experience base to understand that a user request, "send a text message to . . . " signifies the user's intent to communicate using a specialized text message service, such as the FaceTime messaging system available on Apple devices, or the Skype SMS system. As noted above, points such as these can be the subject of system "training." Other systems will undoubtedly be added hereafter, either in conventional computing devices or recently introduced devices such as such as Google Glass.

Once the system has analyzed the user's request and identified all the required communication parameters, it can proceed to prepare the resulting information for communication, at step 114. There, the system begins by preparing the fixed information required to transmit a voice message, such as the telephone number and the communication parameters to be encountered on calling that system. To that shell, the system adds the recorded message. In the simple message set out above, forecasting an arrival time at home, the system may be able to obtain complete communication parameters from records of past calls. That result would allow the system to prepare for a call with minimal difficulty.

Finally, at step 116, the system transmits the required voice message, employing the desired communication parameters. For audio messages, the system could be configured to expand or enhance messages using stock phrases compiled by the user. In that instance, the system could have a number of prepared phrases, such as "Please return this call today," or "Our meeting is rescheduled for _____," and the like already recorded and associated with a shorthand keyword. The user could say, for example, "Return today," and the system could generate the message, "Please return this call today," and so on. Text messages and the like would be somewhat easier to construct, but the system could similarly flesh out the user request by building a message based upon typical salutation, heading, and closing, gleaned from previous messages.

A point that requires some attention is ensuring that the system is prepared to receive various standard messages from telephone systems. To deal with instances in which the system needs to interact with the user during the course of a communication, a system agent can be provided, equipped to offer assistance and deal with certain user inquiries. Techniques for constructing such a system are known to those in the art and will not be described further here. The system agent should be capable of recognizing a telephone system message that tells that the recipient's voice mail box is full, for example, and it should be prepared to inform the user of that fact. These and other standard tasks will become apparent as telephone systems become more accustomed to receiving automated voice mail traffic.

Figure 4:
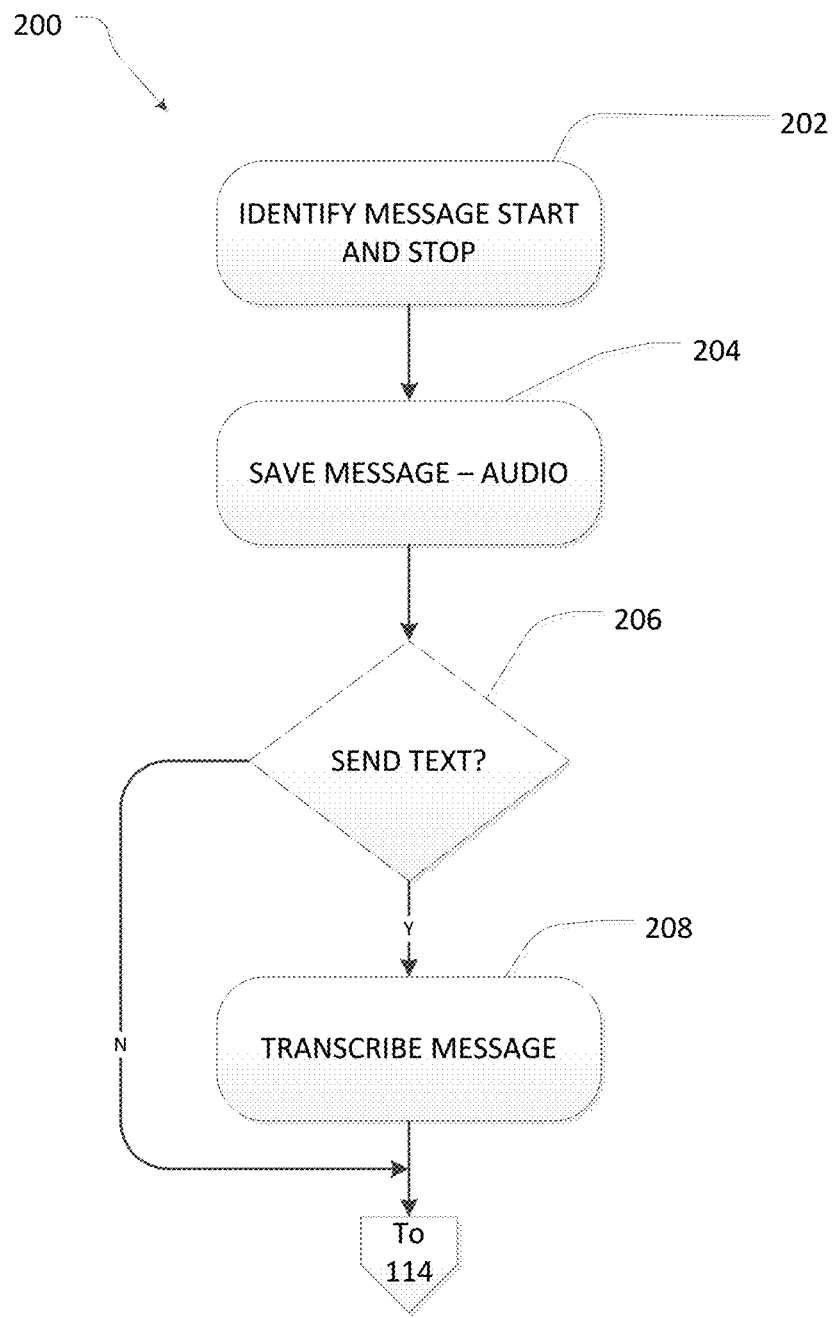
FIG. 4 is a flowchart illustrating a detailed process within the method of FIG. 3.

FIG. 4 details the method 200 involved in processing a message for delivery set out at step 110 in FIG. 3. This method begins by identifying the message start and stop points. For simple messages, that task may be straightforward. In the message discussed above, "tell Natalie I will be home at 6:30," the system can easily identify the communication portion as "tell Natalie" and the message as the audio for "I will be home at 6:30." Other messages may require some degree of semantic analysis, a process well known to those of skill in the art.

Having identified the message itself, the system first copies the message as audio content in step 204. Here, the most straightforward process would save this information as an audio file, in a common format such as .WAV. Such formats can be highly wasteful of storage space, however, and therefore some degree of compression might be desirable. In those instances, the system could be provided with means for saving the audio content in a compressed format, such as .MP3, .WMA, or the like. Although techniques such as lossless storage could be employed, neither the typical content nor the anticipated storage times of voice mail messages generally justify such treatment.

Next, in step 206, the system determines whether to send this as a text message as well as an audio message. Text can be employed as either an alternative or a backup to traditional audio voice mail. In a backup role, one could send a voice message to the recipient's home telephone, with a text message routed to a cell phone. Alternatively, the voice mail could be sent to both home and cell numbers, and the text message could be sent to the recipient's Skype account or some other messaging system. Given the wide availability of communication channels, a user can set up individual communication patterns for frequent recipients, with default methods available in general.

If a text version of the message is to be employed, the message is transcribed at step 208. Because speech transcription is challenging, errors can and will occur. Because of this fact, it may be helpful to insert a disclaimer or warning message in the outgoing communication that includes a transcription, e.g. "Transcribed by SoundHound's automated system, please excuse typos". At that point, the method 200 rejoins the main method flow, shown in FIG. 3.

If the system determines not to send a text message, based either on save preferences or on a particular user choice, program flow skips step 208 and proceeds directly to rejoin the main message flow at step 114 (FIG. 3).

A number of variations and adaptations of the disclosed system and method can be envisioned and implemented by those having skill in the art. For example, some embodiments of the present disclosure could include a one-step voice memo feature. Such a system would not be restricted to sending messages to others, but rather it could prepare memos for the user herself. For illustration, example grammars that could be used to support this feature (omitting the begin . . . end variants) include:

VMU::=record memo AUDIO
VMU::=store memo AUDIO
VMU::=send memo AUDIO
VMU::=memo AUDIO Here again, brackets denote optional symbols. The system could opt to send the message portion of the utterance to the user in a number of ways. The device's onboard recording feature (the "record" variant), or a special memo storage allocated in system storage 94 (FIG. 2b) (the "store" variant), or the system could proceed exactly as set out for voicemail, using the user's voice mail mailbox as the destination (the "send" variant) or finally (the default variant, listed last) it could be set up by user options to use one or more of the variants just described. That functionality can be implemented by adapting the execution of steps 112, 114, 116 (FIG. 3) in a straightforward manner. Note that in all cases, the AUDIO non-terminal is responsible for delimiting the recording.

Another closely related alternative could be termed "record and send." That feature allows the user to record some sound in the ambient environment and then send the recording to someone. If the user desires to record a message from a third person, for example, this feature could perform that task. A user traveling with his child, for example, could send a recorded message from the child to her mother by uttering a statement such as, "Send to Natalie, start . . . end" or "start recording . . . send to Natalie." The system could then prepare communication parameters to send the audio recording to the user's wife. Meanwhile, the user could hold out the device toward the child, allowing the child to generate a message by speaking into the microphone. Alternatively, this could be used to record some engine noise and send it to the mechanic. In this situation, there may not be a pause for AUDIO to find a possible end of the segment. When finished recording, the user could make a suitable statement (such as "end" or "stop recording," and there are other examples above) to have the system turn off the recording. Afterwards, the system could proceed to send the message, as set out above.

Finally, when recording someone else's conversation, there might be a "safe" mode where end commands such as "end" or "stop" would only be accepted from the same user that originated the recording; this would rely on speaker identification techniques that are known in the field.

The specification has described a method and system for processing a speech utterance that includes a communication portion and a message portion. Those of skill in the art will perceive a number of variations possible with the system and method set out above. These and other variations are possible within the scope of the claimed invention, which scope is defined solely by the claims set out below.

We claim:

1. A method for natural language processing of a speech utterance input to a computerized system, comprising:
   receiving and storing a speech utterance in a computerized system, the speech utterance comprising words spoken by a user, the spoken words including a communication portion and a message portion;
   parsing the natural language speech utterance to identify the communication portion of the utterance and the start and the end of the message portion within the speech utterance;
   analyzing the communication portion to determine one or more communication parameters, a communication parameter indicating a destination or channel for message delivery; and
   automatically transmitting an audio message based on the message portion of the speech utterance using a channel and one or more destinations indicated by the one or more communication parameters.

2. The method of claim 1, wherein the destination is a voice mail mailbox.

3. The method of claim 1, wherein the destination is an email address.

4. The method of claim 1, wherein the destination is a user account on a social networking website.

5. The method of claim 1, wherein the destination is one or more user accounts on a service used to initiate the communication.

6. The method of claim 1, further including transcribing the message portion.

7. The method of claim 6, wherein transmitting further includes transmitting the transcribed message portion as an SMS or MMX message.

8. The method of claim 1, wherein identifying communication parameters includes obtaining a destination mailbox from a contacts list.

9. The method of claim 1, further comprising a recording device recording at least a portion of the message portion from the ambient environment of the recording device.

10. The method of claim 9, wherein the recording can be stopped only by a voice command from the person who initiated the recording.

11. A system for processing a natural language message in a computerized system, comprising:
   a recording device that receives and stores a speech utterance in the computerized system, the speech utterance comprising words spoken by a user, the spoken words including a message portion and a communication portion; and
   a processor coupled to a memory storing instructions, the instructions which when executed cause the processor to perform:
      parsing the natural language speech utterance to identify the communication portion of the utterance and the start and the end of the message portion within the speech utterance;
      analyzing the communication portion to determine one or more communication parameters, a communication parameter indicating a destination or channel for message delivery; and
      automatically transmitting an audio message based on the message portion of the speech utterance using a channel and one or more destinations indicated by the one or more communication parameters.

12. The system of claim 11, wherein the destination is a voice mail mailbox.

13. The system of claim 11, wherein the destination is an email address.

14. The system of claim 11, wherein the destination is a user account on a social networking website.

15. The system of claim 11, wherein the destination is one or more user accounts on a service used to initiate the communication.

16. The system of claim 11, the memory further storing instructions, which when executed by the processor, causes the processor to include transcribing the message portion.

17. The system of claim 16, wherein the instructions that cause the processor to transmit further cause the processor to transmit the transcribed message portion as an SMS or MMX message.

18. The system of claim 11, wherein identifying communication parameters includes obtaining a destination mailbox from a contacts list.

19. The system of claim 11, wherein the recording device records at least a portion of the message portion from the ambient environment of the recording device.

20. The system of claim 19, wherein the recording can be stopped only by a voice command from the person who initiated the recording.

\* \* \* \* \*